(12) United States Patent
Kress

(10) Patent No.: US 10,857,606 B2
(45) Date of Patent: Dec. 8, 2020

(54) MULTI-EDGE REAMER

(71) Applicant: Mapal Fabrik für Präzisionswerkzeuge Dr. Kress KG, Aalen (DE)

(72) Inventor: Jochen Kress, Aalen (DE)

(73) Assignee: MAPAL FABRIK FUR PRAZISIONSWERKZEUGE DR. KRESS KG, Aalen (DE)

( * ) Notice: Subject to any disclaimer, the term of this patent is extended or adjusted under 35 U.S.C. 154(b) by 0 days.

(21) Appl. No.: 16/611,530

(22) PCT Filed: May 9, 2018

(86) PCT No.: PCT/EP2018/062110
§ 371 (c)(1),
(2) Date: Nov. 7, 2019

(87) PCT Pub. No.: WO2018/206704
PCT Pub. Date: Nov. 15, 2018

(65) Prior Publication Data
US 2020/0238409 A1    Jul. 30, 2020

(30) Foreign Application Priority Data

May 11, 2017    (DE) .......................... 10 2017 208 017

(51) Int. Cl.
*B23D 77/00*    (2006.01)

(52) U.S. Cl.
CPC ........ *B23D 77/00* (2013.01); *B23D 2277/105* (2013.01); *B23D 2277/205* (2013.01); *B23D 2277/62* (2013.01); *Y10T 408/909* (2015.01)

(58) Field of Classification Search
CPC .... B23D 77/00; B23D 77/02; B23D 2277/62; B23D 2277/105; B23D 2277/205
See application file for complete search history.

(56) References Cited

U.S. PATENT DOCUMENTS 5,282,705 A * 2/1994 Shiga ...................... B23B 51/00
                                                                  408/211
7,004,692 B2 * 2/2006 Hecht ................... B23B 31/008
                                                                  408/233

(Continued)

FOREIGN PATENT DOCUMENTS

AT        141103 B    *  3/1935
DE    19729644 A1    *  1/1999    .......... B23C 5/1081

(Continued)

OTHER PUBLICATIONS

International Search Report (in English and German) and Written Opinion (in German) issued in PCT/EP2018/062110, dated Sep. 10, 2018; ISA/EP.

(Continued)

*Primary Examiner* — Eric A. Gates
(74) *Attorney, Agent, or Firm* — Stephen T. Olson; Harness, Dickey & Pierce, P.L.C.

(57) ABSTRACT

A multi-edge reamer has a cutting region having a main body with a central axis. A first number of first cutters and a second number of second cutters extend from the main body. Each first cutter has a cutting edge and an adjoining circular grinding chamfer which forms a guide region for a corresponding first cutter and has a first width. Each second cutter has a cutting edge and an adjoining circular grinding chamfer which forms a guide region for a corresponding second cutter and has a second width. The first width is greater than the second width, the first number of first cutters is greater than the second number of second cutters, and all of the first cutters directly adjoin one another when seen in the circumferential direction so as to be arranged in a continuous group.

10 Claims, 3 Drawing Sheets

(56) References Cited

U.S. PATENT DOCUMENTS

| | | |
|---|---|---|
| 9,073,130 B2 | 7/2015 | Kress |
| 9,079,260 B2 | 7/2015 | Xiao et al. |
| 2005/0169721 A1 | 8/2005 | Schulte |
| 2009/0116913 A1 | 5/2009 | Xiao et al. |
| 2012/0034043 A1 | 2/2012 | Krieg et al. |
| 2012/0183367 A1 | 7/2012 | Kress |
| 2013/0115017 A1* | 5/2013 | Schanz ............... B23D 77/00 407/11 |

FOREIGN PATENT DOCUMENTS

| | | |
|---|---|---|
| DE | 20304580 U1 | 8/2004 |
| DE | 20319341 U1 | 4/2005 |
| DE | 202008006036 U1 | 7/2008 |
| DE | 112008002885 T5 | 9/2010 |
| DE | 102009049087 A1 | 4/2011 |
| DE | 102013202576 A1 | 8/2014 |
| DE | 102016105929 A1 * | 10/2017 ............. B23D 77/00 |
| SU | 963740 A * | 2/1983 |

OTHER PUBLICATIONS

International Search Report for PCT/EP2018/062110, Mapal Fabrik Fur Prazisionswerkzeuge Dr. Kress KG, dated Nov. 21, 2019 with English translation.
Office Action received for the Chinese Patent Application No. 201880031202.9, dated Apr. 21, 2020, 13 pages (5 pages o Original document and 8 pages of English Translation).

* cited by examiner

MULTI-EDGE REAMER

CROSS-REFERENCE TO RELATED APPLICATIONS

This application is a 371 U.S. National Phase of International Application No. PCT/EP2018/062110, filed May 9, 2018, which claims the benefit of German Patent Application No. 10 2017 208 017.5, filed May 11, 2017. The entire disclosures of the above applications are incorporated herein by reference.

The invention relates to a multi-edge reamer.

A reamer of this kind has a cutting region which comprises a main body having a central axis, a number of cutters extending from said main body, each having a cutting edge and an adjoining circular grinding chamfer which forms a guide region for the relevant cutter. Typically, the circular grinding chamfers of all of the cutters, seen in the circumferential direction, have the same width. Reamers of this kind typically experience a deflection during machining of a workpiece, which is particularly noticeable in an improvable surface quality of a machined surface of the workpiece. In addition, the roundness of a bore which is machined using a reamer of this kind is improvable.

The problem addressed by the invention is that of providing a multi-edge reamer of the aforementioned type that does not have the disadvantages mentioned.

The problem is solved by a multi-edge reamer being provided that has the features of claim 1. Advantageous embodiments are described in the dependent claims.

In the proposed multi-edge reamer, at least a first number of first cutters in particular extends from the main body, each first cutter having a cutting edge and an adjoining circular grinding chamfer which forms a guide region for the relevant first cutter and has a first width. In addition, a second number of second cutters extends from the main body, the second cutters each having a cutting edge and an adjoining circular grinding chamfer which forms a guide region for the relevant second cutter and has a second width. The first width is greater than the second width. The first number of first cutters is greater than the second number of second cutters. The multi-edge reamer therefore has more cutters which have the first, greater width of the relevant circular grinding chamfer, than cutters which have the second, smaller width of the circular grinding chamfer. Furthermore, all of the first cutters, seen in the circumferential direction of the main body, are arranged immediately adjacent to one another such that they are arranged in a continuous group. Due to the circular grinding chamfers of the different cutters that have different widths, and the grouped arrangement thereof, there is a symmetrical distribution of cutting and supporting forces when a workpiece is being machined using the multi-edge reamer, such that an improved surface quality, in particular a smoother surface, can be achieved when a workpiece is being machined, and a higher degree of roundness of a machined bore can be achieved.

In this case a cutter is understood to mean, in particular, a region of the reamer which extends radially outward from the main body, the relevant cutting edge being arranged radially on the outside of the cutter, which cutting edge comes into cutting engagement with the machined surface of a workpiece. The cutting edge is preferably geometrically defined. The cutting edges of the different cutters are located in particular on a cutting circle of the multi-edge reamer and in this way define a machining diameter of same. Cutters of this kind are also referred to as flutes or teeth. It is possible for the cutters to be integrally formed with the main body, which can be formed like a core of the multi-edge reamer, from which core the different cutters or flutes extend radially outward in an almost arm-like manner. The cutters can also be formed together with the main body in multiple parts and can preferably be attached thereto, for example by soldering, in particular brazing, welding, and/or gluing, but also mechanically, for example using a screw connection, or in another suitable manner.

The reamer preferably has a shank which extends in the direction of the central axis of the main body, the shank having the cutting region at a first end and a clamping portion at a second end which is opposite the first end along the central axis, by means of which portion the shank is clamped into a tool mount, for example a machine spindle, an extension, or an adapter, generally into a chuck or similar. For machining a workpiece, a relative rotation of the multi-edge reamer is preferably effected about the central axis, relative to the workpiece, the reamer, in a particularly preferred manner, being rotated about the central axis. The cutting edges in this case move in the circumferential direction along the cutting circle and can thus remove material from a machined surface of the workpiece.

An axial direction is understood to be a direction which extends parallel to the central axis, in particular coinciding with the central axis. A radial direction is understood to be a direction which is perpendicular to the central axis. A circumferential direction is understood to be a direction which extends concentrically around the central axis.

The cutting edge of a cutter of the multi-edge reamer is in particular produced as a cutting line of a rake face of the cutter which has the relevant circular grinding chamfer, a flank face, seen in the circumferential direction, preferably adjoining an end of the circular grinding chamfer that faces away from the cutting edge. The circular grinding chamfer thereby forms a transition region between the cutting edge and the flank face, the circular grinding chamfer being designed such that it comes into touching contact with the machined surface of the workpiece, and as a result supports and guides the multi-edge reamer when a workpiece is being machined, the flank face not coming into touching contact with the machined surface when the workpiece is being machined.

A circular grinding chamfer is in particular understood to be a surface region which has been rounding by grinding and is in particular arranged between the cutting edge and the flank face, of which region the radius of curvature is preferably equal to half the nominal diameter of the tool, such that the tool which has the circular grinding chamfer can be supported on a machined surface of a workpiece in a planar manner.

The width of the circular grinding chamfer is measured in each case in the circumferential direction of the reamer. In this case the first width is greater than the second width; the circular grinding chamfers of the first cutters therefore extend over a greater circumferential region than the circular grinding chamfers of the second cutters. Accordingly, the second width is smaller than the first width.

The circular grinding chamfers of all of the first cutters preferably have the same first width. Alternatively or additionally, the circular grinding chamfers of all of the second cutters have the same second width.

That the first number of first cutters is larger than the second number of second cutters means in particular that the first number is at least two, it being possible for the second number to be one. An embodiment of the multi-edge reamer is therefore possible that has exactly two first cutters and exactly one second cutter. In a preferred embodiment, the sum of the first number of first cutters and the second number of second cutters is an even number. In other embodiments of the reamer, however, it is also possible for the first number and the second number to add up to an odd number.

The fact that all of the first cutters are immediately adjacent to one another in the circumferential direction means in particular that only one and exactly one continuous group of first cutters exists, first cutters and second cutters not being arranged alternately, for example. In particular, the first cutters are not divided into two separate, respectively continuous groups of first cutters by, for example, two second cutters, which in turn are arranged so as to be separated from one another by first cutters. Instead, if the multi-edge reamer has more than two first cutters, two immediately adjacent first cutters are associated with each first cutter, with the exception of two peripheral first cutters of the continuous group, only one immediately adjacent, additional first cutter only being associated with each of the two peripheral first cutters, said peripheral first cutters having no first cutter as an additional, immediately adjacent cutter. This additional cutter is in particular a second cutter if the multi-edge reamer only has first and second cutters, but not third cutters which do not have a guide region, or have a circular grinding chamfer having a third width. The fact that all first cutters are immediately adjacent to one another, such that they are arranged in a continuous group, therefore in particular means that the multi-edge reamer has no more than two peripheral first cutters which each have only one immediately adjacent first cutter associated therewith.

The multi-edge reamer is preferably free of separate guide regions which are separated by a cutting edge. In particular, the multi-edge reamer preferably does not have a guide flute, a guide flute or a guide region which is separate from a cutting edge being understood to be a flute or region which exclusively has a guide function and/or a support function, but does not have a cutting function.

According to one development of the invention, all of the second cutters, seen in the circumferential direction, are immediately adjacent to one another such that they are arranged in a continuous group. In this case, the multi-edge reamer preferably has a plurality of second cutters. The multi-edge reamer therefore preferably also has exactly two, and in particular no more than two, peripheral second cutters, each of which has only one immediately adjacent second cutter associated therewith, an immediately adjacent cutter which is not a second cutter being associated with each peripheral second cutter. If both the first cutters and the second cutters are grouped in the manner described, the result is a particularly smooth operating behavior of the multi-edge reamer, and therefore a particularly high quality of a machined surface of a workpiece and a particularly high degree of roundness of a machined bore.

An embodiment of a multi-edge reamer that has only first cutters and second cutters is preferred. In particular no third cutters are therefore provided that either have no guide region and therefore no circular grinding chamfer, or have a round grinding bevel having a third width which is different from the first width and from the second width. In this case it is self evident that the second cutters are also immediately adjacent to one another and arranged in a continuous group, if this applies to the first cutters.

According to a development of the invention, at least one of the cutters selected from the at least two first cutters and the at least one second cutter, has an flank face which adjoins the circular grinding chamfer. As already mentioned above, the circular grinding chamfer, seen in the circumferential direction, therefore adjoins the cutting edge, the flank face again adjoining the circular grinding chamfer. The cutting edge in particular transitions into the flank face by means of the circular grinding chamfer.

According to one development of the invention, the cutters, seen in the circumferential direction, are arranged at unequal angular distances from one another. This means in particular that the cutters are not distributed symmetrically along the circumference of the main body. They are instead arranged along the circumference such that there is asymmetrical distribution. In this case it is possible for only one angular distance between two adjacent cutters to be different from an angular distance which each of the other cutters have to one another. It is also possible, however, for all angular distances between cutters which are adjacent to one another in pairs, to be different from one another, such that no angular distance is provided twice. Other distributions of equal or different angular distances are also possible. An asymmetric distribution of the cutters along the circumference of the main body contributes to reducing or completely avoiding rattling of the reamer when a workpiece is being machined, which rattling reduces the surface quality of a machined workpiece. The corresponding distribution of the cutters thus also contributes to a high quality of the machined surface and to a particularly high degree of roundness of a machined bore.

According to one development of the invention, the cutters, seen in the circumferential direction, have unequal widths at the transition of said cutters to the main body. The flutes of the reamer therefore in particular have different strengths or thicknesses, such that they have a different stability and rigidity. This can also help to reduce vibrations or rattling when a workpiece is being machined.

According to one development of the invention, the flank face of at least one cutter, selected from the at least two first cutters and the at least one second cutter, is larger than the flank face of at least one other cutter, selected from the at least two first cutters and at least one second cutter.

In particular, it is possible for the first cutters to have larger flank faces than the second cutters. It is also possible, however, for the second cutters to have larger flank faces than the first cutters. It is possible for the flank faces of all first cutters to be the same size, the flank faces of all second cutters also being equal to one another, the size of the flank faces of the first cutters, however, preferably being different from the size of the flank face of the second cutters. It is also possible, however, for at least two first cutters to have flank faces which are different sizes from one another, and/or for at least two second cutters to have flank faces which are different sizes from one another.

A size of an flank face is understood in particular to be a flank face width which is measured in the circumferential direction.

According to one embodiment of the multi-edge reamer, it is possible for the width of the flank face to be scaled relative to the width of the relevant cutter, in particular in the region of the transition to the main body, such that wider cutters have wider flank faces, narrower cutters having narrower flank faces.

It is also possible for at least one cutter to have a divided flank face which has a first flank face region immediately adjacent to the circular grinding chamfer, and a second flank face region adjoining the first flank face region, the first flank face region preferably transitioning into the second flank face region by means of a bend or a curvature. Accordingly, the first flank face region and the second flank face region preferably enclose an angle with one another that is different from 0° and from 180°. It is possible for all of the first flank face regions of the reamer to be the same size, only the second flank face regions differing in size. In this case, the size of the second flank face regions in particular can depend on the width of the relevant cutter in the region of the transition to the main body, it being possible for wider cutters in particular to have larger second flank face regions.

It is also possible for narrower cutters to have only one homogeneous flank face having only one flank face region, wider cutters having two flank face regions. It is also possible for the first flank face region to be the same size for all of the cutters, in particular the same size as the single flank face region of the narrower cutters which have only one flank face region, the wider cutters having larger flank faces as a result, such that said wider cutters have the second flank face region in addition to the first flank face region, which second region can be the same size for all wider cutters but can also be different sizes among the wider cutters, in particular depending on the relevant width of the wider cutters in the region of the transition thereof to the main body.

According to one development of the invention, a sum of the first widths is from at least 3.5% to at most 10% of a tool circumference of the multi-edge reamer. The sum of the second widths is alternatively or additionally from at least 0.4% to at most 1.3% of the tool circumference. Alternatively or additionally, a sum of the first widths and the second widths is from at least 3.9% to at most 11% of the tool circumference.

A tool circumference is in this case understood in particular to be the circumference of the cutting circle of the multi-edge reamer. A sum of the first widths is understood to be the sum of the first widths of the circular grinding chamfers of all of the first cutters. If the first width is constant for all of the first cutters, said sum corresponds exactly to the constant first width multiplied by the number of first cutters. A sum of the second cutters is correspondingly understood to be a sum of the second widths of the circular grinding chamfers of all of the second cutters. If the second width is constant for all of the second cutters, said sum corresponds precisely to said constant second width multiplied by the number of second cutters. A sum of the first widths and the second widths is understood to be a sum of the first widths of the circular grinding chamfers of all of the first cutters, and additionally of the second widths of the circular grinding chamfers of all of the second cutters. If the first width and the second width are each constant over all of the cutters that are respectively associated with said widths, said sum corresponds to the sum of the first constant width multiplied by the number of first cutters, and the second constant width multiplied by the number of second cutters.

Using these explicitly mentioned values for the sums of widths, a very stable and also precise tool can be provided, such that a surface machined using the multi-edge reamer is particularly smooth and a machined bore is particularly round.

According to one development of the invention, the multi-edge reamer has exactly one second cutter. In this case the already mentioned advantages are realized in a particular way. The multi-edge reamer can have different numbers of first cutters. For example, it is possible for the multi-edge reamer to have from at least two first cutters up to at most ten first cutters, preferably at most nine first cutters, more preferably at most eight first cutters, particularly preferably at most seven first cutters. The multi-edge reamer preferably has from at least three first cutters up to at most seven first cutters. The multi-edge reamer preferably has three first cutters, five first cutters, or seven first cutters.

According to a development of the invention, the first width is from at least 0.3 mm to at most 0.55 mm. Alternatively or additionally, the second width is preferably from at least 0.1 mm to at most 0.35 mm. In these ranges of values, the already mentioned advantages are realized in a particular way.

According to one development of the invention, it is finally provided that the sum of the first number of first cutters and the second number of second cutters is four, six or eight. Using these values, the already mentioned advantages are realized in a particular way. In this case, the multi-edge reamer preferably exclusively has first cutters and second cutters, but no further, in particular no third, cutters. The multi-edge reamer therefore preferably has in total exactly four, exactly six or exactly eight cutters.

The invention will be explained in more detail below with reference to the drawings, in which.

Figure 1:
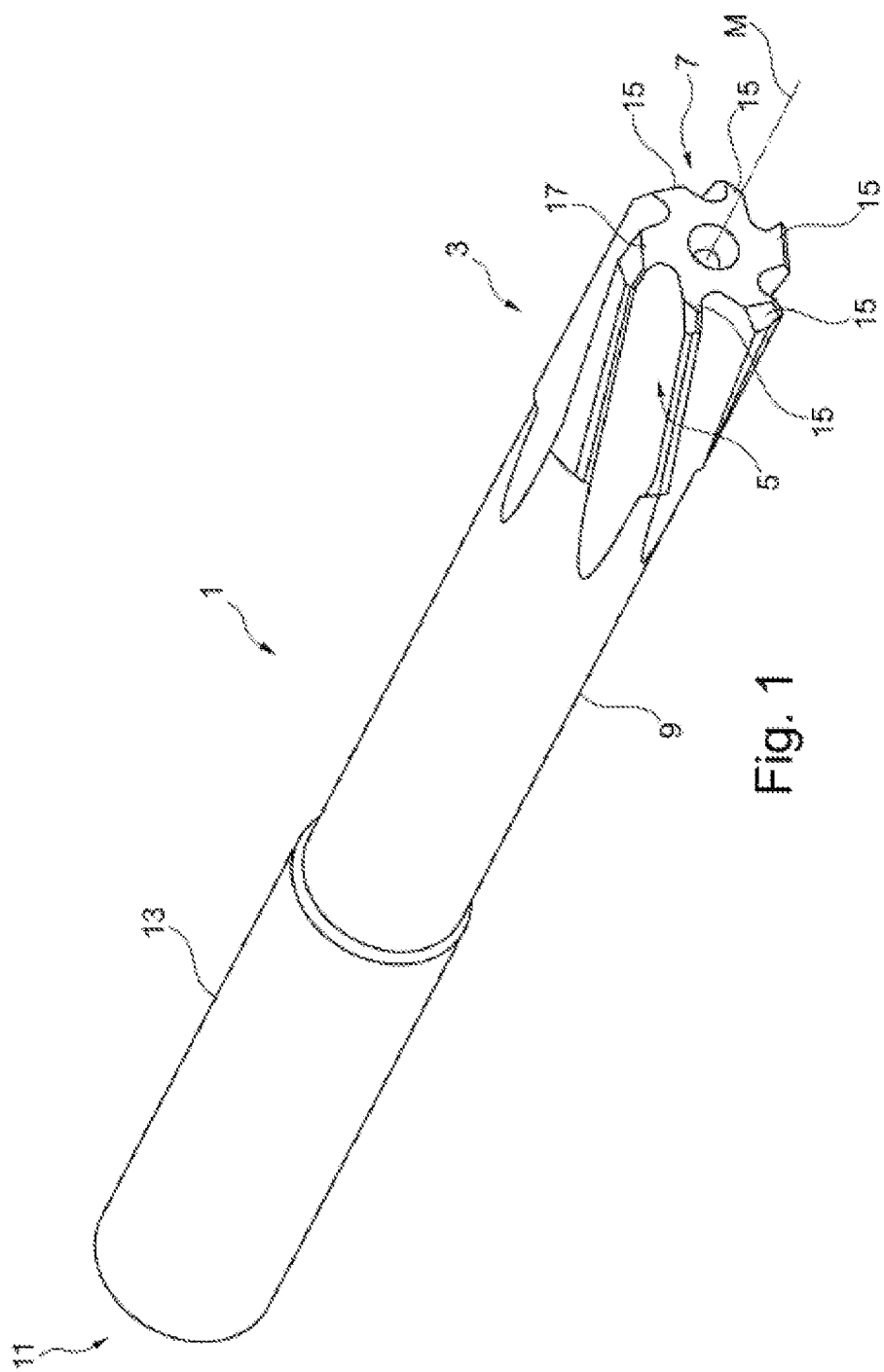
FIG. 1 shows an embodiment of a multi-edge reamer.

FIG. 1 shows an embodiment of a multi-edge reamer 1 which has a cutting region 3 having a main body 5. The main body 5 has a central axis M about which the reamer 1 is set into rotation, in particular for machining a workpiece.

The main body 5 is arranged at a first, end-face end 7 of a shank 9, said main body preferably being formed integrally with the shank 9. In particular, it is possible for the cutting region 3 to be machined from the material of the shank 9 in the region of the end-face end 7.

At the second end 11 of the shank that is opposite the end-face end 7, seen in the direction of the central axis M, i.e. seen in the longitudinal direction, the shank 9 has a clamping portion 13 which, in a manner which is known and conventional per se, can be connected to a chuck, an adapter, an extension, and/or a machine spindle, in order to set the reamer 1 into rotation and to be able to machine a workpiece.

A first number of first cutters 15 extends from the main body 5. Said cutters 15 extend radially outward from the main body 5 in an arm-like manner, the main body 5 in this regard forming a core of the cutting region 3. The cutters 15 are also referred to as flutes. A second number of second cutters 17 also extend from the main body 5. The second cutters 17, exactly like the first cutters 15, also extend radially outward from the main body 5 in an arm-like manner, and are also referred to as flutes. In this regard, there is no difference between the first cutters 15 and the second cutters 17.

The embodiment of the reamer 1 that is shown has five first cutters 15. The first number is therefore five. The embodiment also has exactly one second cutter 17. The second number is therefore one. The sum of the first number and the second number is in this case therefore six. The multi-edge reamer 1 in particular has a only six and exactly six cutters in total, and therefore, in total, exclusively has first cutters 15 and second cutters 17, and in this case has exactly one second cutter 17.

In other embodiments of the multi-edge reamer 1, it is possible for the sum of the first number and the second number to be four or eight. Odd sums of the first number and the second number are also possible, however.

In other embodiments of the multi-edge reamer 1, it is possible for the number of first cutters 15 to be at least two to at most ten, preferably at most nine, more preferably at most eight, particularly preferably at most seven. In particular, the first number can be three or seven.

Figure 2:
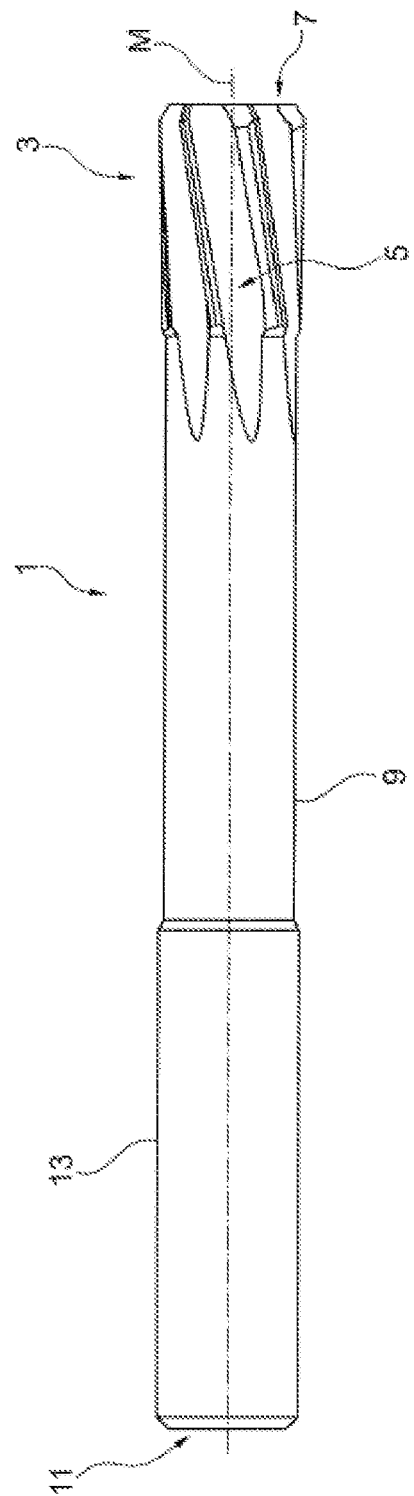
FIG. 2 shows a side view of the embodiment of the multi-edge reamer according to FIG. 1.

FIG. 2 shows a side view of the embodiment of the reamer 1 according to FIG. 1. Identical and functionally identical elements are provided with the same reference signs, such that reference is made to the previous description in this regard. In this case, the shank 9 which extends in the direction of the central axis M, together with the clamping portion 13 and the cutting region 3, can again be seen particularly well. As already mentioned, the multi-edge reamer 1 for machining a workpiece is preferably set into rotation about the central axis M which, in this regard, is the longitudinal axis or longitudinal extension of the reamer 1. A radial direction is perpendicular to the central axis M. A circumferential direction concentrically surrounds the central axis.

Figure 3:
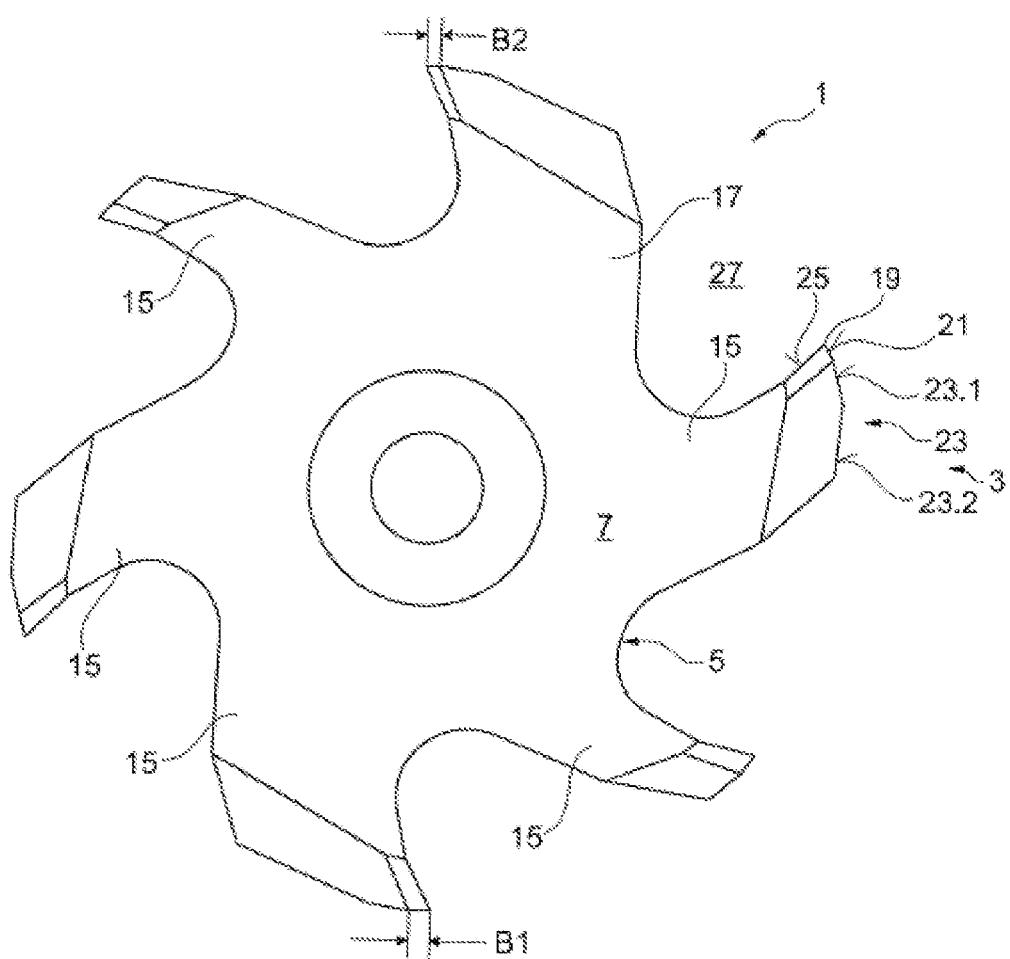
FIG. 3 shows an end view of the embodiment of the multi-edge reamer according to FIGS. 1 and 2.

FIG. 3 shows an end view of the embodiment of the multi-edge reamer 1 according to FIGS. 1 and 2. Identical and functionally identical elements are provided with the same reference signs, such that reference is made to the previous description in this regard. In this case, the gaze of the observer in FIG. 3 falls on the end-face first end 7 of the shank 9, and therefore on the end face of the cutting region 3.

It is clear from FIG. 3 that a cutting edge 19 is associated with each cutter 15, 17 of the first cutters 15 and of the second cutters 17, only one cutting edge 19 being denoted in this case by a corresponding reference sign, for the sake of better clarity. Furthermore, each cutter 15 has a guide region in the form of a circular grinding chamfer 21 that immediately adjoins the cutting edge 19, seen in the circumferential direction, only one of the circular grinding chamfers 21 being provided in this case with a reference sign, for the sake of clarity. The circular grinding chamfers 21 act to support and guide the reamer 1 on a machined workpiece surface.

The circular grinding chamfers 21 of the first cutters 15 have a first width B1, measured in the circumferential direction, the circular grinding chamfers 21 of the second cutters 17 having a second width B2, measured in the circumferential direction, which in this case applies to exactly one second cutter 17. The first width B1 is greater than the second width B2.

It can further be seen that the first number of first cutters 15 is greater than the second number of second cutters 17, the first number, as already stated, being five, the second number being one, in the embodiment of the reamer 1 which is specifically shown in this case.

It can also be seen that all of the first cutters 15, seen in the circumferential direction, are immediately adjacent to one another, such that they are arranged in a continuous group. In particular, only and exactly two first cutters 15 are therefore provided which are not framed on both sides by a first cutter 15, but have only one immediately adjacent first cutter 15 on one side and on the other side instead have an adjacent second cutter 17. All of the other first cutters 15, with the exception of the two peripheral first cutters 15, are each adjacent to a first cutter 15 on both sides thereof.

The distribution of the cutters 15, 17 and of the widths B1, B2 that is proposed, leads to a particularly smooth and high-quality surface machining of a machined workpiece. The machined surface can in this case be particularly smooth, and a machined bore can be particularly round.

All of the second cutters 17, seen in the circumferential direction, are preferably also immediately adjacent to one another such that they are arranged in a continuous group. This is in particular the case when one embodiment of the multi-edge reamer 1 exclusively has first cutters 15 and second cutters 17, but no further cutters, in particular third cutters.

The cutters 15, 17 each have an flank face 23 which, seen in the circumferential direction, adjoins the relevant circular grinding chamfer 21. For the sake of clarity, only one of the flank faces 23 is denoted with the corresponding reference sign. The cutting edges 19 are each in particular cutting lines of a rake face 25 which is arranged on each of the cutters 15, 17, together with the relevant circular grinding chamfer 21.

Chip spaces 27 are formed between each of the cutters 15, 17 which extend radially outward from the main body 5 in an arm-like manner, in which chip spaces chips of a workpiece machined using the reamer 1, which chips are removed by the cutting edges 19 and run off over the rake faces 25, arrive, and over which chip spaces the chips can be transported away. For the sake of improved clarity, only one of the rake faces 25 and one chip space 27 are marked with the corresponding reference signs.

In this case the cutters 15, 17 are arranged, seen in the circumferential direction, at unequal angular distances from one another, i.e. distributed in particular asymmetrically along the circumference of the reamer 1.

At the relevant transition of the cutter to the main body 5, seen in the circumferential direction, the cutters 15, 17 also have widths which are at least in pairs or all individually unequal and in particular different from one another. The widths of the cutters 15, 17 at the transition thereof to the main body 5 are measured in the circumferential direction.

In a corresponding manner, the flank faces 23 of the different cutters 15, 17 have different widths, measured in the circumferential direction. In particular, it is possible for the flank faces 23 of the first cutters 15 to be larger, i.e. wider than the flank faces 23 of the second cutters 17, or, vice versa, for the flank faces 23 of the second cutters 17 to be larger than the flank faces 23 of the first cutters 15. It is also possible, however, for the flank faces 23 of the first cutters 15 and/or the flank faces 23 of the second cutters 17 to each have widths which are different from one another. In particular, it is possible for all of the cutters 15, 17 to each have flank faces 23 which have different widths.

At least one of the cutters 15, 17 preferably has a divided flank face 23, which has a first flank face region 23.1 directly adjoining the circular grinding chamfer 21, and a second flank face region 23.2 directly adjoining the first flank face region 23.1. In the shown embodiment, all of the cutters 15, 17 have divided flank faces 23 of this kind. The first flank face region 23.1 in this case transitions into the second flank face region 23.2 by means of a kink. Alternatively, the transition can also be designed as a curvature. The first flank face region 23.1 and the second flank face region 23.2 enclose an angle with one another that is different from 0° and 180°.

A sum of the first widths B1 is preferably between 3.5% and 10% of the tool circumference of the reamer 1. A sum of the second widths B2 is preferably between 0.4% and 1.3% of the tool circumference of the reamer 1. A sum of the first widths B1 and the second widths B2 is preferably between 3.9% and 11% of the tool circumference.

The first width B1 is preferably between 0.3 mm and 0.55 mm. The second width B2 is advantageously between 0.1 mm and 0.35 mm.

Overall, it can be seen that particularly high surface qualities and high degrees of roundness of bores can be achieved using the proposed reamer 1.

The invention claimed is:

1. A multi-edge reamer comprising:
a cutting region having a main body with a central axis; and
a first number of first cutters and a second number of second cutters extend from the main body, each first cutter having a first cutting edge and an adjoining first circular grinding chamfer which forms a first guide region for a corresponding first cutter and has a first width, and each second cutter having a second cutting edge and an adjoining second circular grinding chamfer which forms a second guide region for a corresponding second cutter and has a second width,
wherein:
the first width is greater than the second width,
the first number of first cutters is greater than the second number of second cutters, and
all of the first cutters, seen the circumferential direction, are immediately adjacent to one another so as to be arranged in a first contiguous group.

2. The multi-edge reamer according to claim 1, wherein all of the second cutters, seen in the circumferential direction, are immediately adjacent to one another, so as to be arranged in a second contiguous group.

3. The multi-edge reamer according to claim 1, wherein at least one of at least one cutter selected from the at least two first cutters and the at least one second cutter has a flank face which adjoins the first circular grinding chamfer or the second circular grinding chamfer.

4. The multi-edge reamer according to claim 1, wherein the first cutters and the second cutters are arranged at unequal angular distances from one another.

5. The multi-edge reamer according to claim 1, wherein the first and second cutters, seen in the circumferential direction, have unequal widths at a transition to the main body.

6. The multi-edge reamer according to claim 1, wherein a first flank face of at least one cutter selected from the at least two first cutters and the at least one second cutter, is larger than a second flank face of at least one other cutter selected from the at least two first cutters and the at least one second cutter.

7. The multi-edge reamer according to claim 1, wherein a sum of the first widths is between 3.5% and 10% of a tool circumference, a sum of the second widths is between 0.4% and 1.3% of the tool circumference, or a sum of the first widths and the second widths is between 3.9% and 11% of the tool circumference.

8. The multi-edge reamer according to claim 1, wherein exactly one second cutter is provided.

9. The multi-edge reamer according to claim 1, wherein the first width is between 0.3 mm and 0.55 mm, the second width is between 0.1 mm and 0.35 mm.

10. The multi-edge reamer according to claim 1, wherein a sum of the first number of first cutters and the second number of second cutters is four, six or eight.

* * * * *